United States Patent
Schmüdderich

(10) Patent No.: US 9,889,858 B2
(45) Date of Patent: Feb. 13, 2018

(54) CONFIDENCE ESTIMATION FOR PREDICTIVE DRIVER ASSISTANCE SYSTEMS BASED ON PLAUSIBILITY RULES

(71) Applicant: HONDA RESEARCH INSTITUTE EUROPE GMBH, Offenbach/Main (DE)

(72) Inventor: Jens Schmüdderich, Offenbach (DE)

(73) Assignee: HONDA RESEARCH INSTITUTE EUROPE GMBH, Offenbach/Main (DE)

(*) Notice: Subject to any disclaimer, the term of this patent is extended or adjusted under 35 U.S.C. 154(b) by 0 days.

(21) Appl. No.: 14/520,501

(22) Filed: Oct. 22, 2014

(65) Prior Publication Data
US 2015/0112570 A1 Apr. 23, 2015

(30) Foreign Application Priority Data
Oct. 22, 2013 (EP) .................................... 13189690

(51) Int. Cl.
*B60W 50/00* (2006.01)
*B60W 40/04* (2006.01)
(Continued)

(52) U.S. Cl.
CPC ........ *B60W 50/0097* (2013.01); *B60W 30/09* (2013.01); *B60W 30/0956* (2013.01);
(Continued)

(58) Field of Classification Search
CPC ............. B60W 50/0097; B60W 30/09; B60W 30/0956; B60W 40/04; B60W 50/14;
(Continued)

(56) References Cited

U.S. PATENT DOCUMENTS 5,343,206 A * 8/1994 Ansaldi ................. G01S 13/931
342/179
6,301,532 B1 * 10/2001 Kull .................... B62D 15/0245
701/301
(Continued)

FOREIGN PATENT DOCUMENTS

DE 10 2006 057 277 A1 6/2008
DE 10 2011 001 904 A1 10/2012
EP 2 562 060 A1 2/2013

OTHER PUBLICATIONS

Notice of Allowance application No. 14/520,531 dated Oct. 7, 2015.
(Continued)

*Primary Examiner* — Nicholas Kiswanto
(74) *Attorney, Agent, or Firm* — Squire Patton Boggs (US) LLP

(57) ABSTRACT

The invention relates to a driving assistance system including a prediction subsystem in a vehicle. According to a method aspect of the invention, the method comprises the steps of accepting an environment representation; calculating a confidence estimate related to the environment representation based on applying plausibility rules on the environment representation, and providing the confidence estimate as input for an evaluation of a prediction based on the environment representation.

13 Claims, 4 Drawing Sheets

(51) Int. Cl.

| | |
|---|---|
| *G01S 13/93* | (2006.01) |
| *G06K 9/00* | (2006.01) |
| *G01S 7/41* | (2006.01) |
| *G01S 13/72* | (2006.01) |
| *B60W 50/14* | (2012.01) |
| *B60W 30/09* | (2012.01) |
| *B60W 30/095* | (2012.01) |
| *B60W 30/18* | (2012.01) |
| *G01S 13/86* | (2006.01) |

(52) U.S. Cl.
CPC ............ *B60W 40/04* (2013.01); *B60W 50/14* (2013.01); *G01S 7/411* (2013.01); *G01S 13/726* (2013.01); *G01S 13/931* (2013.01); *G06K 9/00805* (2013.01); *B60W 30/18163* (2013.01); *B60W 2550/10* (2013.01); *B60W 2550/20* (2013.01); *G01S 13/867* (2013.01); *G01S 2013/936* (2013.01); *G01S 2013/9357* (2013.01)

(58) Field of Classification Search
CPC ...... G01S 7/411; G01S 13/726; G01S 13/931; G06K 9/00805
See application file for complete search history.

(56) References Cited

U.S. PATENT DOCUMENTS

| | | | | |
|---|---|---|---|---|
| 7,340,380 | B2* | 3/2008 | Klotz | B60W 30/16 701/29.1 |
| 7,389,281 | B2* | 6/2008 | Strobel Stewart | G06N 5/048 706/52 |
| 8,804,459 | B2* | 8/2014 | Steimel | G01S 3/8086 367/100 |
| 9,187,091 | B2* | 11/2015 | Mills | B60W 40/107 |
| 2004/0189448 | A1* | 9/2004 | Eggers | B60R 1/00 340/425.5 |
| 2005/0010351 | A1 | 1/2005 | Wagner et al. | |
| 2005/0021201 | A1 | 1/2005 | Klotz et al. | |
| 2007/0203617 | A1* | 8/2007 | Haug | B60W 10/184 701/1 |
| 2010/0228419 | A1 | 9/2010 | Lee et al. | |
| 2010/0265330 | A1 | 10/2010 | Li et al. | |
| 2013/0099943 | A1 | 4/2013 | Subramanya | |
| 2014/0336866 | A1* | 11/2014 | Kloeden | G08C 25/00 701/30.3 |
| 2015/0112571 | A1 | 4/2015 | Schmudderich | |

OTHER PUBLICATIONS

European Search Report dated Mar. 20, 2014 corresponding to European Patent Application No. 13189690.4.

Ismail Dagli et al., "Cutting-in Vehicle Recognition for ACC Systems—Towards Feasible Situation Analysis Methodologies," Intelligent Vehicles Symposium, Jun. 14-17, 2004, IEEE Proceedings 2004, pp. 925-930.

Adrian Broadhurst et al., "Monte Carlo Road Safety Reasoning," Intelligent Vehicles Symposium, Jun. 6-8, 2005, IEEE Proceedings 2005, pp. 319-324.

European Search Report dated Mar. 28, 2014 corresponding to European Patent Application No. 13189698.7.

\* cited by examiner

CONFIDENCE ESTIMATION FOR PREDICTIVE DRIVER ASSISTANCE SYSTEMS BASED ON PLAUSIBILITY RULES

BACKGROUND

Field

The present invention relates to a driving assistance system including a prediction subsystem for passive or active assistance of a driver of a vehicle, and further relates to a corresponding method, software product, and a vehicle equipped with such a driving assistance system.

Description of Related Art

A manifold of driving assistance systems for vehicles is available today which aim at increasing driving comfort and/or safety of the passengers of a vehicle. Based on various sensor equipment such as radar, lidar, cameras, etc., functions related to driving or maneuvering range from distance sensing and parking assistance to sophisticated "Advanced Driver Assistant Systems" (ADAS) such as, for example, cruise-control functions, e.g. "Intelligent Adaptive Cruise Control" (IACC), which may include a lane change assistant, collision mitigation functions, emergency braking, etc.

Functions related to, e.g., ADAS may include a detection of other vehicles or objects moving in front or behind the ego-vehicle, and may include functions for predicting a future behavior of moving objects. The predictions may be used by the driving assistant for active control of the ego-vehicle and/or for providing information to the driver, e.g. for presenting a warning message via display or audio means to the driver.

While predictions serve generally well as a basis for decisions in advanced driver assistance systems, there remain problems. There is a general demand for advanced assistance functions to operate with high reliability, which includes avoiding situations that may let the driver feel uncomfortable or that may even require intervention of the driver.

However, sensor data are generally limited in accuracy due to limitations of the available sensor equipment, its range, orientation, etc., and due to inherent uncertainties of the measurement techniques. Besides error margins in the sensor data, sensor systems are also prone to errors such as misdetection, late detections, and/or wrong detections of entities in the environment of the host vehicle. These error sources may in turn lead to less reliable predictions, and driving assistants need to implement strategies to deal with uncertainties in the sensor data and sensing results.

On a more detailed level, the operation of some driving assistant functions may be based on sensing one entity only; as an example, a simple cruise control function may comprise keeping a predetermined distance to the preceding vehicle. In this case the operation is limited by the detection accuracy of the sensor data related to the detection of the preceding vehicle only. However, more sophisticated functions may require data related to multiple entities or objects, and may require even secondary data derived from the sensor data, such as data representing, e.g., a gap between two vehicles detected in the vicinity of the host vehicle. It is clear that an error such as a misdetection of one of the vehicles will cause an error in the assistant function; however, also mere inaccuracies in the detected positions of the two vehicles lead to an accumulated inaccuracy in the derived gap width which may result in a wrong decision on whether the gap is or will be sufficient for a third vehicle to perform a lane change. Predictions based on such decisions may in turn also be wrong and may result in a system response which appears confusing and unacceptable to the driver and/or other traffic participants.

The straightforward solution to enhancing system reliability is providing additional sensor equipment and/or high-performance equipment. This may serve to improve the available data basis, but at increasing hardware complexity and costs.

Assuming instead a given sensor equipment, various approaches to deal with sensor data inaccuracies are known for driving assistants with prediction subsystems. Some approaches explicitly assume perfect sensor equipment without taking further measures.

Broadhurst, A., et al., "Monte Carlo Road Safety Reasoning", Intelligent Vehicles Symposium, 6-8 Jun. 2005, IEEE Proceedings 2005, p. 319-324, ISBN: 0-7803-8961-1, describe a framework for reasoning about the future motion of multiple objects in a road scene. Monte Carlo path planning is used to generate a probability distribution for the possible future motion of every car in the scene. The car may be controlled directly using the best predicted action, or the car may display a recommended path to the driver, or may display warnings on dangerous objects or regions on the road. Sensor uncertainty is said to be a future consideration.

According to another approach, errors in the perception of the environment are only implicitly considered.

US 2010/0228419 A1 describes a technique for risk assessment in an autonomic vehicle control system. Each of a plurality of objects detected proximate to a vehicle is monitored by various sensor equipment such as long- and short-range radar and a front camera. Sensor data are fused and, based on the fused data, object locations are predicted relative to a projected trajectory of the ego-vehicle. A collision risk level between the vehicle and each of the objects during a lane-change maneuver is assessed with respect to potential actions of the detected objects such as continuing with a fixed velocity, mild braking, or hard braking. A lane change maneuver is controlled according to the assessment and risk tolerance rules specifying spatial safety margins.

Sensor accuracy is discussed and it is appreciated that sensory detection and measurement of object locations and conditions are to be referred to as "estimates". However, no explicit treatment of these estimates is performed any further. The fused object data comprise a degree of confidence in the data estimate.

EP 2 562 060 A1 (EP '060 for short hereinafter) describes a technique in a host vehicle for predicting a movement behavior of a target traffic object with exemplary emphasis on target objects cutting-in to a lane of the host vehicle or cutting-out from the lane of the host vehicle. The technique is based on two separate prediction modules, wherein a context based prediction (CBP) is related to a recognition of a movement behavior, i.e. a determination of "what" will happen, while a physical prediction (PP) is related to a determination of "how" a behavior will or may happen. The context based prediction relies on at least indirect indicators, while the physical prediction relies on direct indicators.

An indicator comprises a measurable variable conveying information about the future or ongoing behavior of a target vehicle and a confidence value indicating the true-state of the measurable variable. The confidence value is obtained by combining the sensor-confidence of all perceived scene elements which have been evaluated for the computation of the measurable variable, wherein the sensor confidence is a value for the reliability of the sensed information. Indicators can be combined with each other.

Direct indicators comprise observable variables, which are observable if and only if the behavior to be detected has started. For example, for predicting a lane-change, a set of direct indicators may comprise one or more of a lateral velocity, a lateral position relative to the lane, a changing orientation relative to the lane, and a changing orientation relative to other traffic participants.

Indirect indicators comprise observable variables, which are already observable before the predicted behavior has started. Indirect indicators may be defined as a set of indicators excluding direct indicators. For example, indirect indicators may relate to information about a relation between at least one traffic participant and one or more other traffic participants or static scene elements, such as an indicator indicating whether or not a fitting gap is available on a lane neighboring to the host-vehicle.

Other indirect indicators may relate to information about driver intentions, which may actively be communicated by the traffic participant whose behavior is to be predicted. Examples are intentions presumably indicated with a turning-signal, a braking-light, or information received via car-to-car-communication.

A set of potential trajectories may be computed for a target vehicle. By using the predicted movement behaviors from CBP, the set of relevant trajectories may be reduced. Matching a situation model against the history of perceived positional data in PP may help to further reduce the relevant trajectories.

More specifically, for predicting a target vehicle's future positions, in a first step, the probability for the target vehicle to perform one of a set of possible movement behaviors is estimated by the CBP. Some or all of these movement behaviors are validated by means of a PP. The purpose of the physical prediction is twofold: First, it validates the set of possible trajectories against a combination of the results of the CBP, the physical evidence, and vehicle relations. Second, it estimates the future position of each vehicle. In a final step a mismatch detection analyzes the consistency of the PP and the CBP. In case of mismatch, a fallback to the PP can be performed.

The context based prediction, physical prediction, and mismatch detection can be encapsulated in situation specific models and may be performed by different hardware units within the driver assistance system. Suited models fitting to the vehicle's environment can be activated or deactivated based on environment perception or self-localization.

Active control resulting from a wrong prediction based on sensor inaccuracy or sensing errors may need to be stopped and reversed when the target vehicle shows an unpredicted behavior or a behavior which has been predicted with low probability. The resultant control may seem inappropriate, confusing and not comfortable to the driver and/or other traffic participants. The assistance system described in EP '060 therefore intends to minimize wrong predictions as far as possible by means of the introduction of situation models and a mismatch detection, amongst others.

According to still another approach to enhance system reliability, sensor uncertainty is modeled and may then directly or indirectly influence the prediction result. Sensor uncertainties can be modeled, e.g., based on assumptions of sensor accuracy. The estimated uncertainties may then influence the prediction result.

Dagli, I., et al., "Cutting-in Vehicle Recognition for ACC Systems—Towards Feasible Situation Analysis Methodologies", Intelligent Vehicles Symposium, 14-17 Jun. 2004, IEEE Proceedings 2004, p. 925-930, ISBN: 0-7803-8310-9, describe a cutting-in vehicle recognition functionality for ACC systems that utilizes a probabilistic model for situation analysis and prediction. In order to cope with low sensor data quality, sensor data filtering is combined with Kalman filters and situation analysis with probabilistic networks, in order that low quality sensor data is faded out in the decision process.

SUMMARY

In view of the conventional art, there remains a need for a cost-efficient technique for predictive driving assistance which is improved in its reliability with regard to detection inaccuracies and detection errors.

The above need is satisfied by a method for a prediction subsystem in a driving assistance system of a vehicle. The method comprises the steps of accepting an environment representation representing at least one entity detected by one or more sensors in an environment of the vehicle; calculating a confidence estimate related to the environment representation based on applying one or more plausibility rules on the environment representation, wherein each plausibility rule comprises a plausible relation between the at least one entity and at least one of another entity and a previous detection of the at least one entity; and providing the confidence estimate as input for an evaluation of a prediction based on the environment representation.

The vehicle (host-vehicle, ego-vehicle) may be a car, truck, or bus, or in general any object intended for driving on a road, motorway, etc., which may include manned vehicles driven by a driver but also automatically driven vehicles such as robot vehicles. In this respect, the terms 'driver assistance system' and 'driving assistance system' (synonymously used herein) are to be understood as including in general any kind of driving assistance system, which may for example be employed in unmanned vehicles as well.

A driving assistance system may be understood as comprising a prediction subsystem in case of a capability of predicting any kind of future movement and/or other behavior of a moving object.

The detected entities may include any kind of moving or static objects or other structural elements, such as, e.g., lane markings or road areas. For example, moving objects may comprise other vehicles, cars, trucks, busses, motor/cyclists, robotic vehicles, etc. Static objects may comprise stopped vehicles, but also fixed objects such as road signs, traffic lights, road margins, guard railings, walls, trees and bushes, lane markings.

The host vehicle may host any kind of sensor equipment or circuitry, such as one or more radar systems, one or more cameras, etc. The ego vehicle may host a communication system for receiving data from other cars via Car-2-Car communication, data from road side transceiver stations via short range communication or via a mobile communication system. Also data achieved according to one or more of these ways will be referred to as sensor data for sake of conciseness herein.

The 'environment' or 'vicinity' of the host vehicle may be defined by the range of the one or more sensor systems hosted by the vehicle. For example, the environment may reach as far as a radar system's capability of detecting objects with at least a predefined reliability.

An environment representation may represent one or more detected entities in the processing system of the driving assistant, and/or may include a representation of relations of two or more entities with each other. A single detected entity may be represented in the driving assistance system and therefore is a simple example of an environment representation; for instance, the object may be represented as a structural element, unit, or atom having indications of a position and velocity associated thereto, but potentially also further indications such as structural properties, a geometrical extension, a predefined indicator indicating a type of the entity, etc. A more complex environment representation may comprise implicitly or explicitly two objects and a relation therebetween. For example, a detected object may be represented as a vehicle moving ahead of the ego-vehicle. As another example, two objects may be represented as two vehicles driving on the same lane. As still another example, a vehicle may be represented as being related to a lane. It is to be understood that a particular environment representation may comprise a set of other environment representations.

Generally, a confidence estimate may represent a combination of one or more detection confidences related to the associated environment representation. A detection confidence may represent, as a simple example, one or more sensor confidences that are related to that sensor elements contributing to the detection of objects and/or relations represented in the basic environment representation. For example, an environment representation may represent a moving object detected by a radar system hosted by the ego vehicle, and the associated confidence estimate may represent a confidence value of that radar system, e.g. a value provided by the radar system indicating a reliability of the detection of the moving object, one or more accuracy values indicating an accuracy of a detected position, velocity, etc. of the detected moving object, etc.

In case an entity is detected by multiple sensor systems, a corresponding confidence estimate may comprise one or more confidence values for each of the sensor systems, and/or various confidence values may be processed to result in combined confidence values.

Sensor confidences may comprise indications of signal strength, a signal-to-noise ratio, an error indication derived from an error propagation technique, etc. Detection confidences may also result from plausibility checks, as discussed in detail herein.

According to the inventive method, at least one confidence estimate of the system has at least not exclusively been determined based on sensor confidence, but has alternatively or additionally been generated or processed by a plausibility check. For example, the confidence estimate may have been calculated based on at least one plausibility rule.

The environment representations may have confidence estimates associated thereto according to a one-to-one relation; however, one-to-many or many-to-one relations can also be contemplated.

The prediction subsystem or another component of the driving assistant may decide on whether or not the environment representation is used as a basis for a prediction, e.g. whether or not the environment representation is activated or suppressed for scene interpretation/prediction. The decision or evaluation may, for example, include comparing a numerical value of the confidence estimate with one or more other numerical values. For example, the confidence estimate may be assessed to be above or below a predefined threshold value. Additionally or alternatively, the confidence estimate may be compared with one or more other confidence estimates associated to other environment representations.

The prediction subsystem may be based on the concept of direct and indirect indicators as introduced above and detailed in the EP '060. For example, one or more of the environment representations may comprise one or more direct and/or indirect indicators. The confidence estimates may similarly be represented as 'confidence indicators'. For example, a confidence indicator may comprise a variable intended to indicate a confidence of an associated environment representation. The variable may have further parameters or variables associated therewith, e.g., a pointer to an associated environment representation, e.g., a direct or indirect indicator.

A structure of representation for the confidence indicators may be re-used from and may therefore be similar to that of the direct/indirect indicators. For example, the direct/indirect indicators may each be represented as a pair of variables, the first variable indicating an observable value and the second variable indicating an associated confidence value, respectively, while the confidence indicator may be represented as a pair of at least a first variable indicating a confidence estimate and a second variable, pointer, or real or integer variable representing an index number pointing towards one or more associated environment representations.

A plausibility rule may be implemented as a condition, such as an if-condition and/or other conditional expression, which returns a binary value representing either true or false when applied to the environment representation.

Additionally or alternatively, a plausibility rule may comprise a numerical expression which returns a numerical value when applied to the environment representation. As an example for the application of a plausibility rule, the rule may comprise a numerical expression which quantifies a relation between two entities represented in an environment representation. Applying the numerical expression to a specific environment representation returns a numerical result. A condition may be applied to the numerical result, which, e.g., may compare the numerical result to a predefined threshold to arrive at a binary value representing 'true' or 'false'.

According to a numerical or binary result, the confidence estimate may be assigned a numerical value which represents a confidence of the associated environment representation. The confidence may be expressed as a likelihood or probability value, e.g. by a real number between 0 and 1, a real or integer number between 0 and 100 representing a percentage value, etc.

As a specific example, the confidence estimate may be assigned a value between 0 and 1; e.g. a value close to 1.0 may be interpreted in the further processing as indicating that the existence of an entity, relation, etc. has been assessed plausible, while a value close to 0.0 may be interpreted in the further processing as indicating that the existence of an entity, relation, etc. has been assessed implausible.

A plausibility rule may relate properties of a target entity and a further detected entity as detected at the same time point, or may relate one or more properties of one and the same target entity at two different time points. The tested relations are suitable in order to arrive, after the application of one or more plausibility rules, at a confidence estimate indicating a level to which a detection of the target entity is plausible, dependent on the true or false results of the applied rules.

It is to be understood that a plausibility rule may not only ask whether the target entity is or is not related in a particular way to another detected entity, e.g. whether the target vehicle is located between two detected lane markings. Instead, rules may ask for relations to virtual or non-detected entities as well; for example, a rule may ask whether there are other entities such as moving or still objects present in the neighborhood of a target vehicle at all. Similarly, a rule may ask whether or not the target entity has been detected in the past.

As used herein, two entities (or one and the same entity at two different time points) may be said to have a 'relation' already if they are merely present, or could be present, in a scene as detected or detectable by the sensor equipment of the host vehicle. For example, the rule 'is another vehicle present' asks for the presence of a simple relation of the type 'there are multiple vehicles in the scene'. Other rules may ask for relations such as distance relations, e.g. the existence of a gap between two entities, velocity relations, e.g., whether one entity approaches another entity, etc.

Accordingly, the resulting confidence estimate does not or not exclusively relate to sensor confidences, but reflects a plausibility conclusion to which degree at least one currently detected property of a target entity is logically consistent with at least one property of another detected entity and/or a detection of at least one property of the target entity in the past.

Applying a plausibility rule may result in assigning the confidence estimate a predefined value, and/or in increasing/decreasing a value of a confidence estimate by a predefined amount. For example, applying a plausibility rules may result in defining a preliminary confidence estimate as one of setting a predefined value for the preliminary confidence estimate indicating a plausible detection of the environment representation, or setting a predefined value for the preliminary confidence estimate indicating an implausible detection of the environment representation. Application of a further plausibility rule may then result in one of increasing or decreasing a value of the preliminary confidence estimate by a predefined amount.

Calculating a confidence estimate may comprise calculating a combination of the results of applying multiple plausibility rules, wherein the combination comprises at least one of a summation, weighted summation, product, weighted product, and selecting a minimum or maximum of multiple preliminary confidence estimates.

The above-indicated need is further satisfied by a computer program product comprising program code portions for performing the method according to any one of the methods and method aspects outlined above or elsewhere herein, when the computer program product is executed on a computing device, for example one or more electronic processing modules of a vehicle. The computer program product may be stored on a computer readable recording medium, such as a permanent or re-writeable memory within or associated with a computing device or a removable CD-ROM, DVD or USB stick. Additionally or alternatively, the computer program product may be provided for download to a computing device, for example via a data network such as the Internet or a communication line such as a telephone line or wireless link.

The above-indicated need is still further satisfied by a driving assistance system for a vehicle, wherein the driving assistance system includes a prediction subsystem and comprises a component adapted to accept an environment representation representing at least one entity detected by one or more sensors in an environment of the vehicle; a component adapted to calculate a confidence estimate related to the environment representation based on applying one or more plausibility rules on the environment representation, wherein each plausibility rule comprises a plausible relation between the at least one entity and at least one of another entity and a previous detection of the at least one entity; and a component adapted to provide the confidence estimate as input for an evaluation of a prediction based on the environment representation.

Embodiments of the driving assistance system may be adapted to perform at least one of an active control, such as initiating a vehicle actuation, and passive control, such as initiating a driver warning, based on the prediction.

According to various embodiments, the driving assistant system may be adapted to perform a cruise control functionality, for example an ACC function including a prediction of lane change maneuvers, for example cutting-in or cutting-out maneuvers of vehicles moving in the vicinity of the host vehicle.

The prediction subsystem of any of the beforementioned systems may be adapted to perform a context based prediction and a physical prediction, e.g. according to the EP '060 disclosure.

The system and/or any of the functions described herein may be implemented using individual hardware circuitry, using software and/or firmware functioning in conjunction with a general purpose computer or a programmed microprocessor, using an application specific integrated circuit (ASIC) and/or using one or more digital signal processors (DSPs).

The abovementioned need is further satisfied by a vehicle comprising a system as outlined before or described elsewhere herein.

The invention enables the provision of driving assistants with predictive capabilities which are improved in their reliability despite unavoidable detection inaccuracies and detection errors. The approach of improving confidence estimates by including plausibility checks provides a basis for more reliable decisions, i.e. for more reliable active or passive control of a vehicle.

The inventive approach therefore also widens the applicability of predictive driving assistants to vehicles with less sensors and/or intermediate or low quality sensor equipment and therefore to cost-efficient solutions.

The approach discussed herein can make use of the general data structure of indicators including confidence values associated to measurable variables as introduced in EP '060, but can also be implemented independent of that structure in any driving assistant with predictive capabilities.

It is noted that conventionally, confidences values are applied individually for each sensor, or each sensed entity. For instance, when applying Bayesian networks, conditional independence between the entities is at least implicitly assumed. The example of Dagli et al. as discussed further above is a specific embodiment of such networks, and independence of the input nodes is assumed by the structure of the network as explicitly mentioned by the authors.

The invention improves over these approaches by asking for whether or not specific relations between entities are to be found in the detection data or not. In other words, the detection of an entity is checked for plausibility based on detections or non-detections of other entities, or of the same entity at an earlier timepoint. On the basis of additionally including such data in the evaluation, the proposed kind of confidence estimate may enable more reliable decisions.

The invention can be implemented at low costs, as no additional sensor equipment is required. The functionality may be implemented, for example, in form of software modules. Various existing implementations of a driver assistance system may then merely require a software update.

BRIEF DESCRIPTION OF THE DRAWINGS

In the following, the invention will further be described with reference to exemplary embodiments illustrated in the figures, in which.

DETAILED DESCRIPTION

Figure 1:
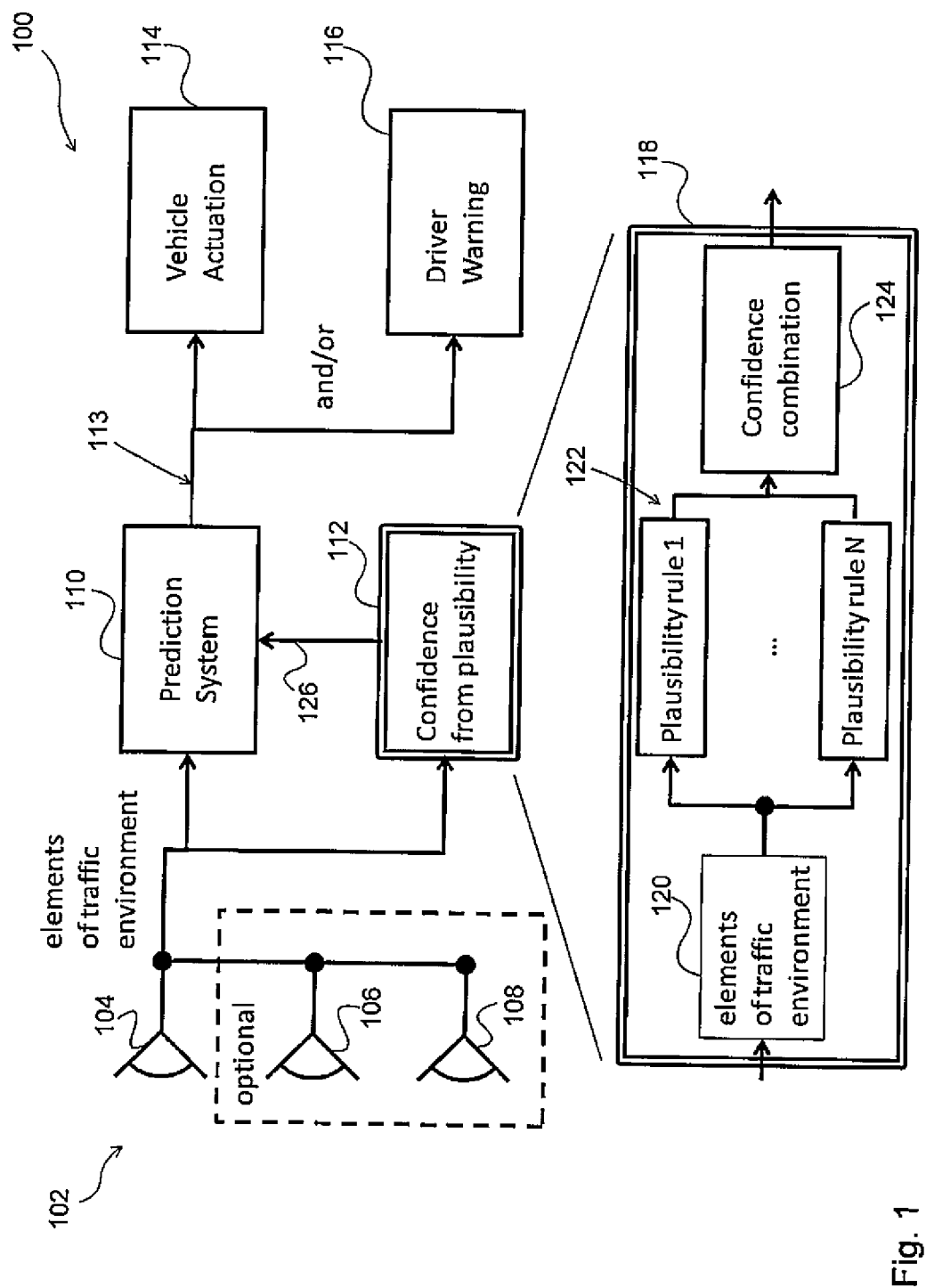
FIG. 1 schematically illustrates on a high level a predictive driving assistant of a vehicle according to an embodiment of the invention.

FIG. 1 illustrates as a high level overview an embodiment of a driving assistant system 100 of a vehicle. The system 100 can be assumed to be implemented on at least one electronic control unit (ECU) of the vehicle and programmed software/firmware functioning thereof. The following discussion will however focus on functional aspects for sake of conciseness and therefore details of hardware/software implementations will mostly be omitted. Further, the figures depict only those components which presently appear to be of relevance for one or more aspects of the invention.

Sensor equipment 102 of the vehicle includes one or more sensor systems 104, 106 and 108, which provide sensor data to, amongst others, a prediction subsystem (PSS) 110 of driving assistant 100. The term 'host vehicle' refers to the vehicle hosting the sensor equipment 102 and driving assistant 100. In case of sensor data received from other vehicles or road-side communication stations such as in a Car2X environment, the sensor equipment 102 is assumed to include a receiver for such data and the term 'host vehicle' is understood herein as including such configuration as well.

Data from sensor equipment 102 may include, for example, data related to sensor confidences, such as signal-to-noise (S/N) ratios, signal strength with regard to a detected entity, error indications such as related to error margins, resulting from applied error propagation techniques, etc.

Sensor data may or may not have a confidence value attached which may be directly derived from the sensor signal. For example, radar sensors may attach a confidence value to each sensed entity, such as a moving or static object, representing a signal strength of a reflected signal. Additionally or alternatively, while not explicitly shown in FIG. 1, sensor confidence data may be the result of sensor data processing in one or more dedicated components associated to at least one of the sensor equipment 102, the assistant system 100, and/or an intermediate processing system.

The prediction subsystem 110 operates to predict an evolution of a detected traffic scene wherein the scene may or may not include the host vehicle. Generally, the prediction subsystem 110 takes into account confidence estimates such as attached confidence values; as a simple example, low confidence values may result in an environment representation such as a detected entity having a low influence on a predicted evolution, while large confidence values may result in an environment representation having a larger influence.

Based on a predicted evolution, the driving assistant 100 may operate to initiate active control of the host vehicle, such as sending a control signal 113 to a vehicle actuation (VA) component 114. Additionally or alternatively, the assistant 100 may perform passive control operations such as providing the or any signal 113 indicative of the predicted evolution of the detected scene to output systems dedicated to provide information to a driver of the vehicle, subsumed in FIG. 1 by a driver warning (DW) component 116 which may be adapted to control a display, an audio system, etc. of the vehicle for presenting alerts, warning messages, alarm indications, etc. to the driver.

The prediction subsystem 110 receives sensor data which may or may not have been pre-processed and will be assumed to be in the form of environment representations 120 representing, for example, detected entities such as vehicles or other moving objects, or static objects such as lane markings or roadside installations, wherein the representation may comprise various data describing a position, a velocity, a geometrical structure or extension, etc.

An environment representation 120 may also include data representing two or more objects, and in this case may generally also include data related to relations between these objects. For example, an environment representation may be related to a first vehicle preceding a second vehicle, and/or the second vehicle approaching the first vehicle. It is noted in this respect that direct and indirect indicators as discussed herein and introduced in the EP '060 can be considered as environment representations.

The prediction subsystem 110 further receives confidence estimates 126 from a confidence estimator subsystem 112, which in particular performs plausibility checks (PC) as described in detail below. A confidence estimate represents an estimated confidence for the correctness of a sensed traffic environment. A confidence estimate may be based on sensor confidences related to signal strength or error propagation indications, or on plausibility rules as detailed further below. As a result, at least one confidence estimate value is assigned to at least one element of a detected traffic scene.

Specifically, one or more environment representations may have confidence estimates assigned thereto, wherein the required processing can be performed by the sensor equipment 102, the PC component 112 and/or the PSS component 110.

The prediction subsystem 110 may further include components for constructing direct indicators (DI) and indirect indicators (II). The concept of direct and indirect indicators has been discussed above, and further details can be found in EP '060.

The indicators may be input to a physical prediction (PP) component and/or a context based prediction (CBP) component, wherein the respective functionality has also been discussed further above and details are given in EP '060.

Generally, a predictive driving assistant system based on context based prediction and physical prediction can be expanded according to the configuration of FIG. 1 by a confidence estimation functionality such as the PC 112 functionality that attaches a confidence value to at least one of the sensed entities in a traffic scene as detected by the host vehicle.

Specifically, the system 100 implements the prediction subsystem 110 with an added technique 112 for confidence estimation based on plausibility, wherein the technique may be generally employed in various driving assistants with predictive capability. The technique can, for example, be implemented within the driving assistant system as described in EP '060.

The component 112 is shown separately from the prediction subsystem 110 for clarity. Component 112 is concerned with performing plausibility checks (PC) and accepts data from sensor equipment 102, which may include, for example, data related to detected entities. Optionally, the accepted data may result from pre-processing of sensor data provided by sensors 104, 106, and 108 at the sensor equipment 102, an intermediate component, and/or the component 112 itself, for example in order to perform factual object detection and classification of detected objects as moving/static, vehicle or lane marking, etc.

Functional details related to the functioning of the PC component 112 are depicted by inset 118. For performing plausibility checks, component 112 receives data 120 which may comprise environment representations representing, for example, detected entities such as vehicles or other moving objects, static objects such as lane markings or roadside installations, wherein the representation may comprise various data describing a position, a velocity, a geometrical structure or extension, etc. More complex environment representations including several environment representations, i.e. nested environment representations, can also be provided.

The operation of component 112 further comprises applying one or more plausibility rules 122 to one or more of the environment representations 120, as will be discussed in detail in the following. As a result of applying the one or more rules 122, a confidence estimate will be calculated based on an appropriate combination 124 of the result of applying each particular plausibility rule.

Figure 2:
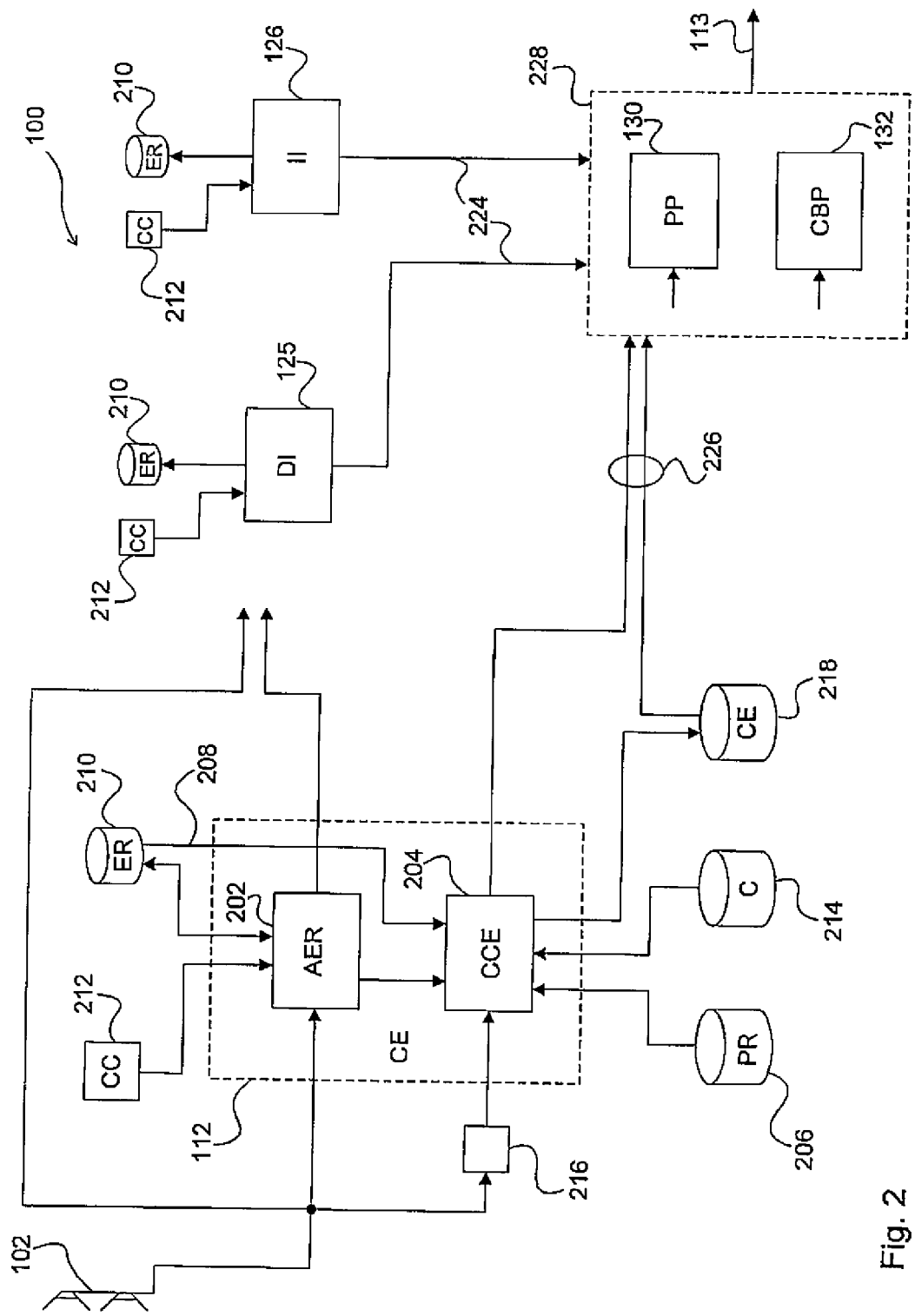
FIG. 2 illustrates functional components of a specific implementation of the driving assistant of FIG. 1.

FIG. 2 illustrates a specific implementation of the driving assistant 100 of FIG. 1, wherein reference numerals are re-used as applicable for clarity. It is to be noted, however, that many other configurations departing from that discussed below with reference to FIG. 2 could be considered depending on details such as desired driving assistant functions, available hardware platforms for the ECU, etc.

The confidence estimator 112 introduced with FIG. 1 is illustrated in FIG. 2 as comprising a component 202 for accepting environment representations (AER) representing at least one entity detected by the sensor equipment 102. Component 202 may be controlled by a control component (CC) 212. The confidence estimator 112 further comprises a component 204 adapted for calculating a confidence estimate (CCE) based on applying one or more plausibility rules on the accepted environment representations.

Figure 3:
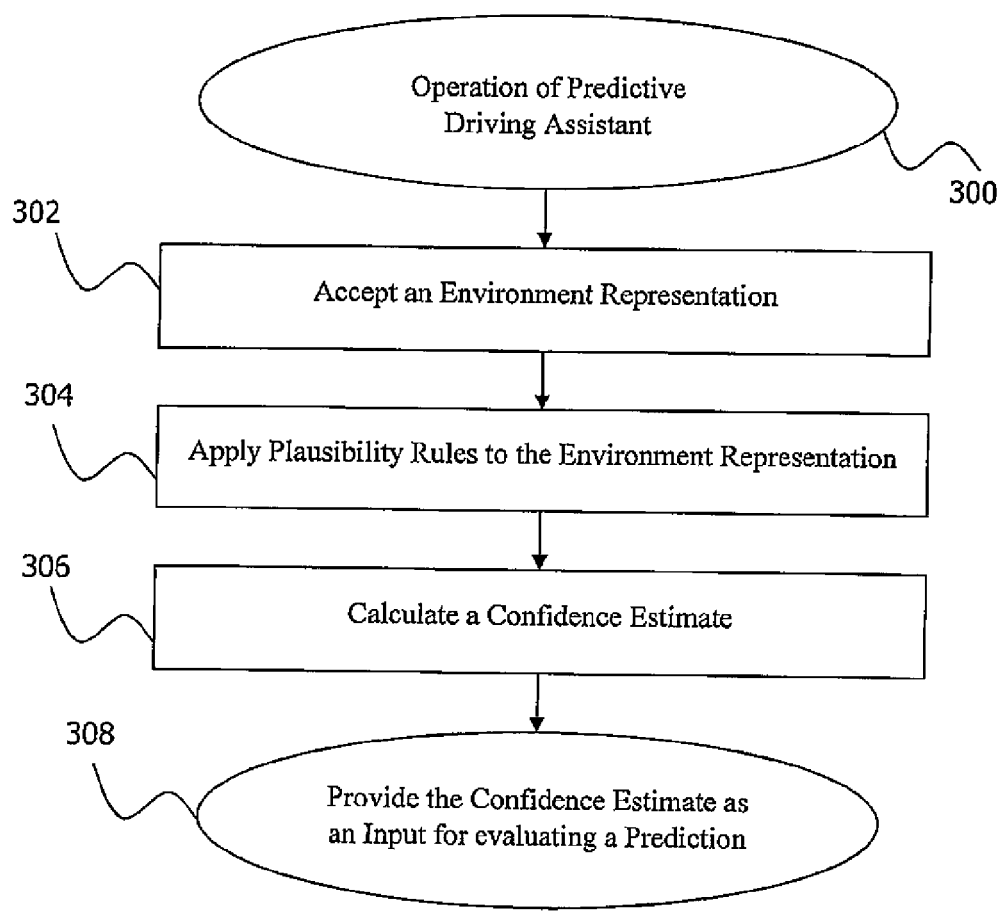
FIG. 3 is a flow diagram illustrating an operation of the driving assistant of FIG. 2.

An operation 300 of the assistant 100 of FIGS. 1 and 2 will be described with reference to the flow diagram in FIG. 3. In step 302, component 202 of confidence estimator 112 accepts one or more environment representations 120. Each environment representation represents at least one entity detected by one or more of the sensors 104, 106 and 108 in an environment of the vehicle.

Additionally or alternatively to accepting environment representations directly from sensor equipment 102, component 202 may retrieve selected environment representations from a storage 210 and may, for example, generate pointers pointing to storage positions of the selected environment representations. Information regarding which of a potentially large number of representations is currently to be selected may be received from control component 212. As a specific example, the control component 212 may control AER component 202 to initiate a plausibility check for one, some, or all of the environment representations available in storage 210. For example, environment representations may be selected to be subjected to a plausibility check in case appropriate plausibility rules are available.

In step 304, the CCE component 204 operates to calculate a confidence estimate related to a selected environment representation. Specifically, component 204 may be triggered by AER component 202, wherein a trigger signal may comprise, for example, one or more of a pointer to a selected environment representation in storage 210, an ID number of a detected entity, an indication of the plausibility rules to be applied to the detected entity, etc.

The CCE component 204 may retrieve one or more applicable plausibility rules 122 from a repository 206, which stores the plausibility rules (PR) available for system 100 in a permanent, semi-permanent, or other fashion. The component 204 then operates to apply the retrieved rules 122 to the selected environment representation.

Generally, each confidence estimate represents a combination of one or more detection confidences related to the associated basic environment representation. The detection confidence may comprise one or more sensor confidences. In this respect, component 204 may accept indications of sensor confidences from a component 216 dedicated to generate such indications based on, e.g., S/N ratios, etc. as provided by the sensor equipment 102. Other sensor confidences based on, e.g., error margins, may be calculated on the basis of received sensor data. Still other sensor confidences may be provided by the component 216 or otherwise based on predefined data regarding known confidence levels for particular sensor systems, etc.

The combination operation to be performed to achieve a confidence estimate based on multiple detection confidences may be any of a summation, weighted summation, product, weighted product, selection of a minimum or maximum, combinations thereof, etc. As an example, a confidence estimate may represent an appropriately defined average of multiple sensor confidences.

Detection confidences may include other or further confidence indications apart from only sensor confidences. As an example, plausibility rules may be applied to detection events such as entity detections. According to the embodiment described with reference to FIGS. 1 and 2, plausibility checks are performed only in component 112; other embodiments can be contemplated, wherein environment representations are checked for plausibility additionally or alternatively in functional components associated to the sensor equipment 102, and/or other parts of the driving assistant 100 or predictive subsystem 110 not depicted in FIGS. 1 and 2.

Generally, a plausibility rule asks or checks for a plausible relation between an entity represented by the selected environment representation and another entity, which may or may not have been under current or earlier detection. As but one example, a relation may concern a trajectory of an entity relative to presence and/or position of another entity, such as a rule asking or checking for a faster vehicle changing lane to overtake a slower vehicle.

Additionally or alternatively, a rule may concern a relation between an entity represented by the selected environment representation and a detection or non-detection of that same entity at an earlier time.

Therefore, applying a plausibility rule means performing a test on a detected entity by asking for the presence or absence of a relation either between that detected entity and a different entity, or to present and past detections of one and the same entity, or both. A plausibility rule may be implemented in the form of an if-condition which returns a binary value such as 'true' or 'false', '1' or '0', 'yes' or 'no', etc., when applied to an environment representation.

According to some embodiments, rules such as those above may by fuzzification return continuous values. As a specific example, a plausibility rule may represent a check such as "did vehicle v appear at the border of field of view?", which returns a binary value such as "yes" or "no". A corresponding fuzzy rule may represent a check such as "how far from the field of view did vehicle v appear?", which returns a continuous value.

In order to check for the presence or absence of a relation, the CCE component 204 may generally retrieve 208 further data from storage 210, for example regarding a different entity which is to be related to the selected entity, or regarding earlier detections of the selected entity. In case two entities are represented by one environment representation and the relevant data thereof is available at component 204, access of storage 210 may be omitted.

Application of a plausibility rule i to an entity j then may result in attributing a confidence value $c_{i,j}$ to a representation of entity j. As a simple example, a confidence value may be set close to 1.0 if the existence of entity j as sensed is decided plausible, and may be set close to 0.0 if the existence of entity j as sensed is decided implausible.

According to additional or alternative prescriptions, applying a plausibility rule may result in setting the confidence value $c_{i,j}$ to a predefined value $c\_const1$ for the confidence estimate indicating a plausible detection of the selected environment representation or entity, or to a predefined value $c\_const2$ for the confidence estimate indicating an implausible detection. As another example for a prescription, depending on the result of applying a rule, an existing confidence value may be increased or decreased by a predefined amount $\Delta c$. Values for $c\_const1$, $c\_const2$, $\Delta c$, etc. may be permanently stored in a dedicated storage area 214 for constants (C).

In step 306, a confidence estimate is calculated for the selected environment representation, e.g. entity. As a plurality of plausibility rules 122 may generally be applied to a selected entity, according to one embodiment, the resultant plurality of confidence values $c_{i,j}$ may be subsequently combined to one confidence value $c_j$ per entity j, where for example $c_j \epsilon [0,1]$. The combination operation may comprise at least one of a summation, weighted summation, product, weighted product, selecting a minimum or maximum, a combination of these measures, etc.

Additionally or alternatively, a single value $c_j$ may be maintained during application of a plurality of plausibility rules and may be sequentially updated, e.g. increased or decreased, each time a result of a rule application is available. An embracing combination operation such as applying one or more weights, etc. would have to be appropriately re-defined in order to be feasible with the sequential updating of $c_j$.

A plurality of entities j may be checked for plausibility; for example in case detected entities have assigned internal ID numbers, the control component may scan through all allocated ID numbers on a regular basis, on the availability of new or updated sensor data, etc.

In step 308, the calculated confidence estimates (CE) $c_j$ may be provided by the confidence estimator 112 for further processing, for example by storing the $c_j$ in storage 218. As a specific example, in case the storage component 218 generally serves for storing confidence estimates, the component 204 when allocating one or more required confidence estimates may merely generate pointers pointing towards the confidence estimates as stored in storage 218.

The newly defined or updated confidence estimate $c_j$ as well as other confidence estimates available in storage 218 may then be used as input for evaluating one or more predictions based on the environment representations associated with the calculated confidence estimates, e.g. those environment representations which comprise the entities the plausibility of detection thereof has been checked with operation 300.

Regarding the exemplary embodiment of FIG. 2, the environment representations evaluated for prediction may comprise direct (DI) and/or indirect (II) indicators which may be calculated by a DI component 125 and an II component 126, respectively. Details of the calculation of direct and indirect indicators are described in EP '060. The resultant environment representations or indications thereof may be provided in storage 210. It is noted that CC component 212 and ER component 210 are both reproduced various times in FIG. 2 purely for reasons of clarity of the figure.

More specifically, a confidence estimate as stored in storage 218 may be used as input for a prediction based on an environment representation. For example, the environment representation may comprise a direct or indirect indicator, which is input to one of a physical prediction (PP) subsystem 130 and a context based prediction (CBP) subsystem 132 as indicated by arrows 224 in FIG. 2. One or more associated confidence estimates may be provided by the subsystem 112 to one or both of the PP 130 and CBP 132 subsystem, as indicated by arrow 226. Despite arrows 224 and 226 indicating a direct functional relationship, the environment representation of step 302 and the confidence estimate of step 306 may be stored in storage 210 and repository 218, respectively, and may be retrieved therefrom by one or both of the PP 130 or CBP 132 component in response to a trigger such as signals 224, 226, and/or other signals such as a signal received from control component 212.

A component of the prediction and decision subsystem 228 may decide, based on the input confidence estimate, whether the corresponding environment representation will be relied upon for a prediction of the further behavior of a detected moving entity based on the associated confidence estimate. For example, the confidence estimate may comprise a numerical value which is evaluated accordingly. For example, the value may be evaluated to be above or below a predefine threshold. According to the evaluation, the environment representation may be activated and a prediction resulting from the environment representation may form the basis for a control operation. Alternatively, the environment representation may be suppressed from being used as the basis for a prediction and a potentially resulting control operation.

If, based on the confidence estimate, the environment representation is found to be reliable, the resulting prediction may lead to the output of a control signal 113 as depicted in FIG. 2. Thereafter, control may be returned to a higher control level.

Operation 300 of the prediction subsystem 100 may be re-initiated for evaluating further confidence estimates and/or environment representations as a basis for predictions. For a comprehensive scene interpretation, generally a plurality of executions 300 may be required depending on a complexity of the driving assistant functionality and/or of the traffic scene, e.g., the number of detected relevant entities, etc. Further, predictions and corresponding control signals will have to be updated on a regular, e.g., periodical or cyclical basis, and/or in response to the acceptance of new sensor data, etc.

While the data processing has been described with reference to FIGS. 1-3 as being performed in real-time, portions of the data processing may be performed and stored in advance, e.g. during manufacture. For example, at least some confidence estimates could be pre-calculated if based, e.g., on constant sensor confidences. Also, calculations related to combinations of fixed confidence estimates could be performed once and the results be stored for use during in-field-operation of the vehicle and the driving assistance system.

Various examples for relations between entities which can be used as a basis for plausibility rules will be discussed in the following.

An exemplary plausibility rule checking for a relation between a vehicle and a lane may be based on the assumption that a vehicle will typically follow a road, i.e. the vehicle will not drive in a direction different from that indicated by a lane, such that, e.g., a detection of a vehicle not driving in lane direction may be decided implausible.

A further exemplary plausibility rule may check a relation between a vehicle and multiple other vehicles, wherein the assumption is held plausible that a plurality of vehicles typically defines a shape of a road, and that a vehicle will typically follow that shape. In other words, the detection of a vehicle driving in a direction which is essentially different from the direction of a road as determined from, for example, a plurality of other vehicles, may be decided implausible.

Another exemplary plausibility rule may ask for a relation between two vehicles, wherein it is held implausible if two different vehicles share a same position on a road within predefined margins. Based on that rule it may be decided implausible if two targets are very close to each other.

Another exemplary plausibility rule may ask for a relation between two vehicles, wherein it is held plausible if one vehicle moves along a trajectory that has previously been predicted by the prediction system. In this case all entities considered to generate the prediction result may be considered plausible.

In the following, few examples for checking plausible/implausible relations between a current detection of an entity and previous detections thereof are presented which also can be used as a basis for plausibility rules.

An exemplary rule may check a relation between a current detection and previous non/detections of the same object based on the assumption that an entity will not suddenly appear or disappear. Therefore, if a vehicle is detected by a sensor, but has not been previously detected, a confidence estimate for the current detection may receive a low value and/or the detection may be decided implausible. The rule may be supplemented by a check of whether the detection is at a border of a sensor field of view, for example.

Another exemplary plausibility rule may ask for physical consistency between various detections of a moving target object, wherein laws of nature are to be observed. Specifically, movement of a vehicle will occur according to its driving direction, velocity, mass, etc. According to one or more corresponding rules, a detection may be decided plausible or implausible based on whether a target vehicle's position or velocity deviates insignificantly or significantly from previous detections of the target vehicle.

Figure 4:
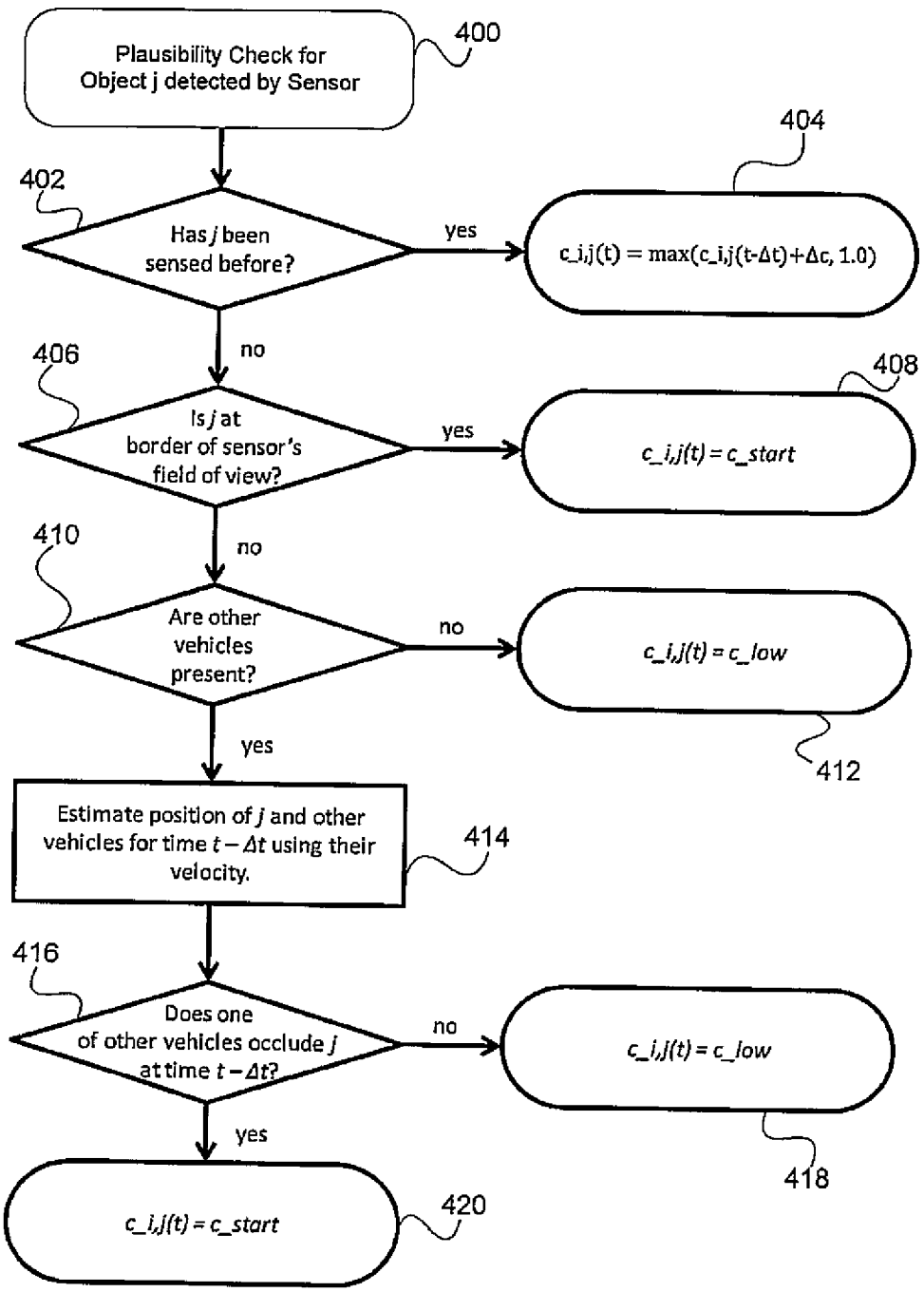
FIG. 4 is a flow diagram illustrating a second operation of the driving assistant of FIG. 2.

FIG. 4 is a flow diagram illustrating in more detail a sequence of one or more plausibility rules, wherein the rules are implemented as combinations of expressions and conditions, and values for confidence estimates are assigned according to the result of applying the condition to the detections. Application of one plausibility rule may comprise the application of one or more conditions.

FIG. 4 illustrates a combination of checks of relations between entities and checks of relations between current and previous detections of one and the same entity. The examples are commonly based on the plausible assumption that a vehicle cannot suddenly appear or disappear. Therefore, if a target entity is detected without previous detections, the target entity either has moved into the sensor field of view or it has been previously masked or obscured by other entities.

Although not elaborated further here, a complementary rule may be based on that, if a target entity has been detected before, but there is a non-detection currently, the target entity either has left the sensor field of view or it is currently masked or obscured by other entities.

According to the example discussed here, predefined values of confidence estimates are assigned according to the result of applying the plausibility rules. A predefined constant c_start indicates a confidence value which may be assigned to objects detected for the first time and wherein the detection is decided plausible. Any further detection may lead to a value of the confidence estimate being increased by a predefined constant value of Ac. A predefined constant confidence value c_low may be assigned to objects detected for the first time and wherein the detection is decided implausible.

The application of plausibility rules is initiated in step 400 of FIG. 4 by a target object j being detected by a sensor, wherein object j may be part of at least one environment representation comprising object j and potentially further entities such as other moving or static objects, etc. One example of an environment representation may comprise data related to object j such as an ID-number, indications of a position, velocity, etc.

In step 402, a condition is applied to the detection of object j, wherein it is checked whether object j has been detected before. It is to be understood that the textual expression "Has j been sensed before" may be represented in the system by a numerical expression. As but one example, the question "Has j been sensed before" may be represented by a numerical representation of "number of times j has been sensed before" or "number of successfully sensed time steps for vehicle j", wherein in this example the numerical expression or representation may be a variable, such as an integer variable, array variable, etc. Other expressions or representations can be contemplated, which for example may be more complex.

The numerical expression can then be evaluated by applying it to a condition (or by applying the expression to the condition, depending on which of the expression and the condition is implemented as operator, and which as operand). As an example, an if-condition may compare a representation of the expression to a predefined threshold, and the further calculation of the confidence estimate depends on the result of the comparison. For instance, the number of times the vehicle j has been sensed before can be compared to the fixed value of 0, and if the number of times vehicle j has been sensed before is above 0, the handling further performs as indicated along the branch referenced "yes" in FIG. 4, otherwise the calculations continue as indicated along the branch referenced "no". Other conditions to be contemplated besides the if condition are, for example, case conditions, switch conditions, etc., as known as such to the person of skill.

The handling along the further decision points 406, 410, etc. is discussed below only according to the textual representations as given in FIG. 4, but can be implemented in the system corresponding to what has been exemplarily discussed in detail for decision 402.

Turning back to decision 402 in its textual representation in FIG. 4, if the decision outputs "yes", a preliminary confidence estimate c_i,j for the current time t may be calculated in step 404 by increasing a previous value of c_i,j by a fixed confidence value amount of Δc, wherein c_i,j being interpreted as a probability may not exceed a value of 1, or 100%, or any other value indicating full certainty of confidence for the present detection.

If it is decided that object j has been detected for the first time in step 402 (branch "no"), it is asked in step 406 if object j has been detected near the border of a sensor field of view. If true, in step 408 the preliminary confidence $c\_i,j$ is set for the present time to the predefined constant confidence estimate value $c\_start$, indicating a first detection being held plausible.

If the condition is false at step 406, in step 410 it is evaluated if other vehicles or objects are present in the vicinity of object j. If not, the preliminary confidence estimate $c\_i,j$ is set to the predefined constant confidence estimate value $c\_low$, indicating a first detection of object j being held implausible.

If the condition in step 410 is evaluated true, in step 414 positions of moving object j and the one or more other static or moving objects detected earlier and now in the vicinity of object j are accepted. The positions may be estimated or may be retrieved from environment representations adapted to keep object trajectories, etc. Alternatively, a temporary storage may cyclically keep environment representations of previous time points for reference purposes, etc.

Based on providing the required data in step 414, in step 416 it is decided whether at an earlier time $t-\Delta t$ at least one other object has obscured target object j. If no, in step 418 the preliminary confidence estimate $c\_i,j$ is set to value $c\_low$, indicating an implausible detection of object j. If yes, in step 420 the preliminary confidence $c\_i,j$ is set to value $c\_start$, indicating a plausible first detection.

The application of the plausibility rule ends with step 420 in FIG. 4. Further plausibility rules may be applied. A final confidence estimate $c\_j$ may be calculated as an appropriate combination of the various resulting $c\_i,j$.

The invention may be implemented with any kind of predictive driving assistant, which includes besides cruise control many more functions such as even parking assistants, and which includes assistant functionalities to be developed in the future.

While the invention has been described in relation to its preferred embodiments, it is to be understood that this description is intended non-limiting and for illustrative purposes only. In particular, various combinations of features wherein the features have been described separately hereinbefore are apparent as advantageous or appropriate to the skilled artisan. Accordingly, it is intended that the invention be limited only by the scope of the claims appended hereto.

The invention claimed is:

1. A method for a prediction subsystem in a driving assistance system of a vehicle implemented by an electronic control unit, the method comprising the following steps:
   accepting an environment representation representing at least one entity, wherein the at least one entity comprises at least one of a static or a moving object, or a structural element which is detected by one or more sensors in an environment of the vehicle;
   applying one or more plausibility rules on the environment representation;
   calculating a confidence estimate related to the environment representation according to a result of the application of one or more plausibility rules on the environment representation, wherein each plausibility rule comprises a plausible relation between the at least one entity and at least one another entity; and
   providing the confidence estimate as input for an evaluation of a prediction based on the environment representation,
   wherein the confidence estimate is an estimate of a degree of influence by the detected entity on the prediction, and
   wherein the driving assistance system is configured to perform at least one of an active control and passive control of the vehicle based on the prediction.

2. The method according to claim 1, wherein a plausibility rule comprises a condition which returns a binary value representing either true or false when applied to the environment representation.

3. The method according to claim 1, wherein a plausibility rule comprises a numerical expression which returns a numerical value when applied to the environment representation.

4. The method according to claim 1, wherein the confidence estimate is assigned a numerical value representing a confidence of the associated environment representation.

5. The method according to claim 4, wherein the confidence is expressed as a probability value.

6. The method according to claim 1, wherein applying one of the plausibility rules comprises computing a confidence estimate as one of:
   setting a predefined value ($c\_start$) for the confidence estimate indicating a plausible detection of the environment representation,
   setting a predefined value ($c\_low$) for the confidence estimate indicating an implausible detection of the environment representation, and
   increasing or decreasing a value of the confidence estimate by a predefined amount ($\Delta c$).

7. The method according to claim 1, wherein calculating the confidence estimate comprises calculating a combination of multiple confidence estimates, resulting from applying multiple plausibility rules, based on at least one of a summation, weighted summation, product, weighted product, and selecting a minimum or maximum.

8. The method according to claim 1, wherein the evaluation comprises deciding on whether or not the environment representation is used for a prediction by comparing a numerical value of the confidence estimate with a numerical value of at least one of a predefined threshold value and numerical values of one or more other confidence estimates.

9. The method according to claim 1, wherein the driving assistance system is adapted to perform a cruise control functionality.

10. A non-transitory computer readable medium comprising program code portions for performing the method according to claim 1 when the computer program is executed by a computing device.

11. A driving assistance system for a vehicle, the driving assistance system including a prediction subsystem and comprising:
   a component adapted to accept an environment representation representing at least one entity, wherein the at least one entity comprises at least one of a static or a moving object, or a structural element which is detected by one or more sensors in an environment of the vehicle;
   a component adapted to apply one or more plausibility rules on the environment representation;

a component adapted to calculate a confidence estimate related to the environment representation according to a result of the application of one or more plausibility rules on the environment representation, wherein each plausibility rule comprises a plausible relation between the at least one entity and at least one another entity; and a component adapted to provide the confidence estimate as input for an evaluation of a prediction based on the environment representation, wherein the confidence estimate is an estimate of a degree of influence by the detected entity on the prediction, and wherein the driving assistance system is configured to perform at least one of an active control and passive control of the vehicle based on the prediction.

12. The system according to claim 11, wherein the prediction subsystem is adapted to perform a context based prediction and a physical prediction.

13. A vehicle comprising a system according to claim 11.

* * * * *